United States Patent
Genuit et al.

[15] 3,636,541
[45] Jan. 18, 1972

[54] LOSS OF PHASE DETECTOR FOR A POLYPHASE POWER SYSTEM

[72] Inventors: Luther L. Genuit, Scottsdale; Roger D. Lackey, Phoenix, both of Ariz.

[73] Assignee: Honeywell Information Systems Inc.

[22] Filed: Apr. 9, 1970

[21] Appl. No.: 26,864

[52] U.S. Cl. ...................340/248 B, 340/249, 340/253 R
[51] Int. Cl. ............................................G08b 21/00
[58] Field of Search.............340/253 R, 253 B, 249, 248 B, 340/248 R

[56] References Cited

UNITED STATES PATENTS

| | | | |
|---|---|---|---|
| 3,217,311 | 11/1965 | Custer et al............................340/249 |
| 3,270,331 | 8/1966 | Kirk et al. ............................340/249 X |
| 3,383,522 | 5/1968 | Apfelbeck et al. ..............340/248 B X |
| 3,284,788 | 11/1966 | Hudson....................................340/239 |
| 2,027,209 | 1/1936 | Starr ...................................340/248 X |
| 3,189,788 | 6/1965 | Cady ..............................340/248 B X |
| 3,210,727 | 10/1965 | McLaughlin et al...............340/249 X |
| 3,243,796 | 3/1966 | Harmon et al......................340/253 B |
| 3,321,754 | 5/1967 | Grimm et al..........................340/249 |

*Primary Examiner*—David L. Trafton
*Attorney*—Edward W. Hughes and Fred Jacob

[57] ABSTRACT

The loss of phase detector employs a plurality of rectifiers each of which is connected between a transistor and a corresponding phase of a polyphase AC power system. Each rectifier couples a signal to the transistor when the corresponding phase provides output power. These signals render the transistor nonconductive. When power is lost in any of the phases of the polyphase system or when voltage in the system decreases below a predetermined value, the transistor is rendered conductive so that a capacitor in series with the transistor is charged by a reference voltage which is connected to the transistor. The charge on this capacitor provides a signal that activates an indicating device which warns that power has been lost in one of the phases of the polyphase power system.

3 Claims, 3 Drawing Figures

INVENTORS.
LUTHER L. GENUIT
ROGER D. LACKEY
BY Lloyd B. Guernsey
AGENT

3,636,541

LOSS OF PHASE DETECTOR FOR A POLYPHASE POWER SYSTEM

BACKGROUND OF THE INVENTION

This invention relates to loss of phase detectors for polyphase power systems and more particularly to a detector which provides a warning signal when there is a loss of power in any phase of the polyphase power system.

In data processing systems, polyphase power sources are often used to provide AC power to the rectifier power supply. The individual phases of the polyphase source are used to provide power for cooling fans, for electric motors and for relays in the processing system. If a line should open in any one of the individual phases of the polyphase source, the cooling fans operating on that phase would not function, so that heat could cause extensive damage to circuit boards and other parts in the data processing system. In addition, an open line could cause voltage from the rectifier power supply to decrease so that data signals could have incorrect values and important data which is stored in the processing system could be lost. Loss of power in one phase of the polyphase system would also cause increased current in the remaining phases of the power supply system which could overload the rectifiers and the transformer windings, thereby causing possible damage to these components. The ripple output voltage of the power supply would also increase, which could cause damage to filter capacitors in the rectifier power supply and could cause noise and error signals to be introduced into the data processing system. It is therefore important that the loss of power in any one phase of the power system be quickly detected so that corrective measures can be taken.

The present invention provides a circuit which checks the voltage output of each phase of the polyphase power system and provides a warning signal when power is lost in any of the phases of this polyphase power system or when the output voltage decreases below a predetermined value. This circuit uses few parts to provide a loss of phase detector which features high reliability and low cost.

It is therefore an object of this invention to provide a new and improved detector which detects a loss of power in any one or more phases of a polyphase power system.

Another object of this invention is to provide a reliable and inexpensive detector to detect the loss of power in one or more phases of a polyphase power system.

A further object of this invention is to provide a new and improved detector which provides a warning signal when the output voltage decreases below a predetermined value.

SUMMARY OF THE INVENTION

The foregoing objects are achieved in the instant invention by providing a new and improved loss of power detector in which signals are coupled from each phase of the power system to a threshold detector. These signals prevent the threshold detector from developing an error signal when all phases are energized. When any one or more phases are not energized, or when the output voltage decreases below a predetermined value, the power detector provides an error signal which causes an indicating device to provide a warning signal.

Other objects and advantages of this invention will become apparent from the following description when taken in connection with the accompanying drawings.

DESCRIPTION OF THE PREFERRED EMBODIMENT

Figure 1:
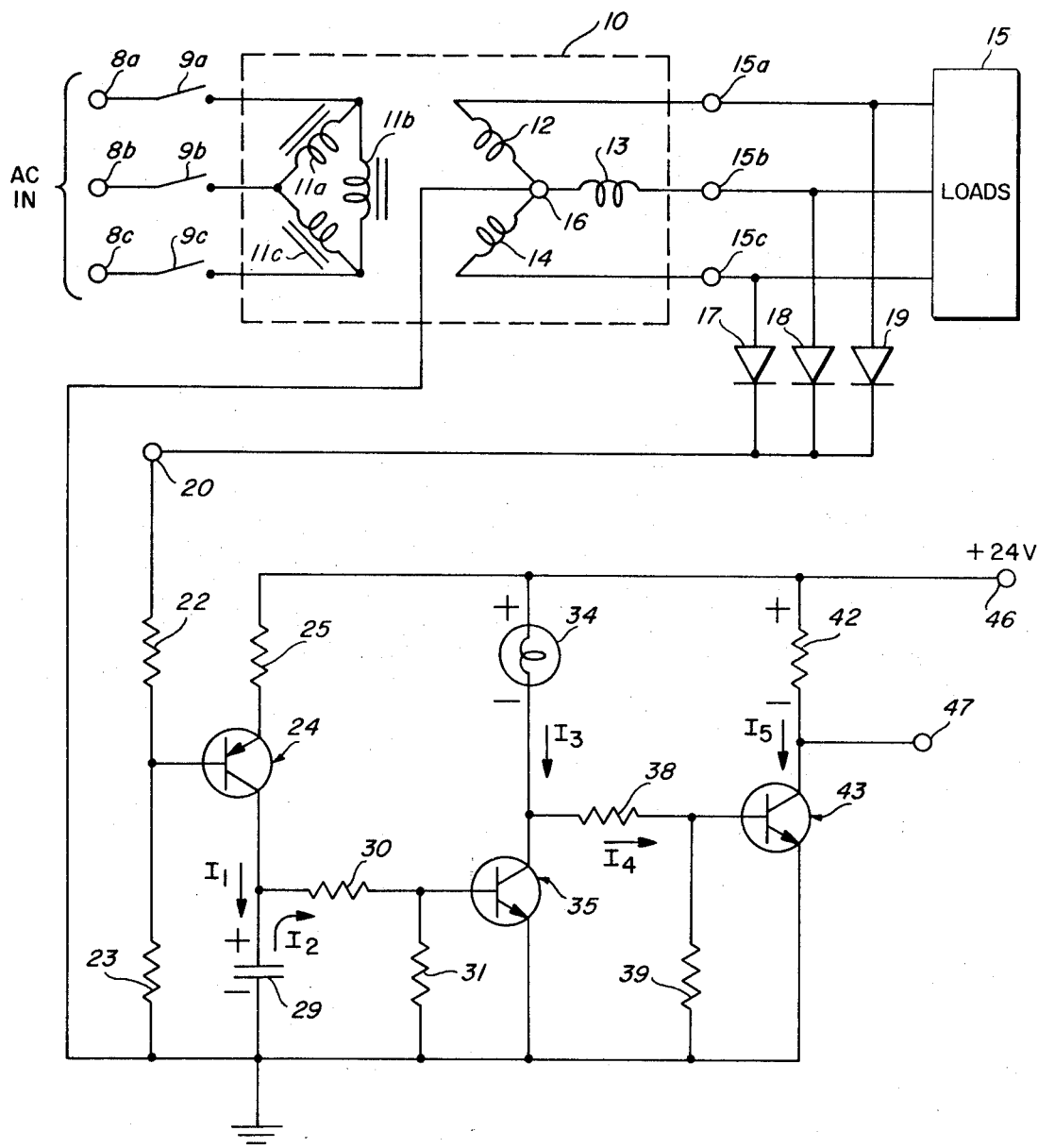
FIG. 1 discloses a circuit diagram of one embodiment of the instant invention.

The circuit shown in FIG. 1 includes a transformer 10 having a plurality of primary windings 11 and secondary windings 12, 13 and 14. The primary windings of the transformer are connected through a plurality of switches 9a–9c to a plurality of input terminals 8a–8c which are connected to a source of three-phase AC power. A plurality of loads 15 are connected between the various phases of the secondary windings. The secondary windings are connected in a wye configuration, with a common or neutral terminal 16 being connected to a source of reference potential, such as ground. The three phases at the output of the secondary of the transformer are each connected to a corresponding phase terminal 15a–15c which are each connected to the anode of a corresponding one of the diode rectifiers 17, 18 and 19. The cathodes of the diode rectifiers 17, 18 and 19 are connected to a voltage divider comprising resistors 22 and 23. The center of the voltage divider is connected to the base of a transistor 24. The emitter of transistor 24 is coupled through a current limiting resistor 25 to a first reference potential, such as a +24 volts. A capacitor 29 is connected between the collector of transistor 24 and a second reference potential, such as ground.

When the voltage at the output of any one of the phases of the secondary of the transformer becomes positive, this positive voltage is coupled through the corresponding diode to the input terminal 20 of the voltage divider comprising resistor 22 and 23. This positive voltage is coupled to the base of transistor 24 and renders transistor 24 nonconductive. When any of the leads from the three phases of the transformer are open or the transformer secondary does not produce an output voltage, the positive voltage is not coupled through the diodes 17, 18 and 19 and resistor 22 to the base of transistor 24 so that transistor 24 is rendered conductive by the positive voltage at terminal 46.

Figure 2:
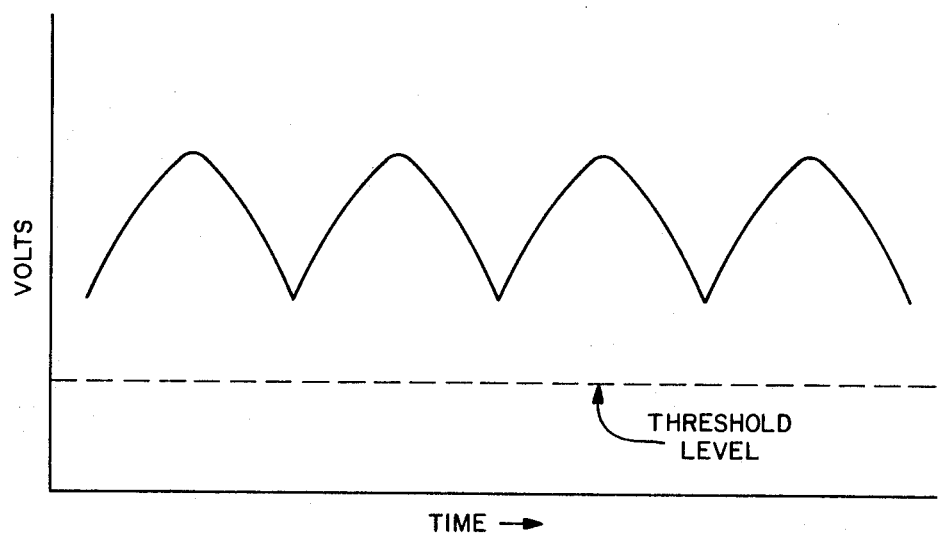
FIG. 2 illustrates the output of the rectifiers when all phases of the polyphase system are energized.
Figure 3:
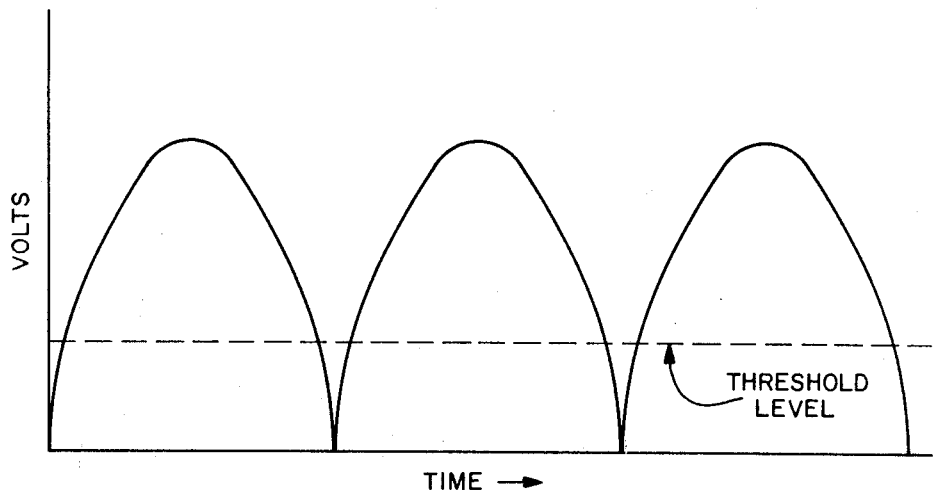
FIG. 3 illustrates the output of the rectifiers when one of the phases of the polyphase power supply is not energized.

FIGS. 2 and 3 illustrate the voltage waveform at input terminal 20, at the top of the voltage divider comprising resistors 22 and 23. When each of the three phases of the transformer provides a voltage through diode rectifiers 17, 18 and 19 to input terminal 20, the voltage at terminal 20 is as shown in FIG. 2. When one of the lines to diodes 17, 18 and 19 is open or transformer 10 does not provide a voltage to these diodes for any other reason the voltage at terminal 20 is as illustrated in FIG. 3. It will be noted in FIG. 2 that the voltage at input terminal 20 always has a voltage greater than a threshold level shown. Whenever the voltage at input terminal 20 is greater than this threshold level, the positive voltage at the base of transistor 24 renders transistor 24 nonconductive so that capacitor 29 does not charge. If the voltage at the base of transistor 24 falls below this threshold value, voltage at terminal 46 causes current to flow from the terminal 46 through resistor 25, from emitter to base of transistor 24, through resistor 23 to ground, thereby rendering transistor 24 conductive. The amplitude of this threshold level is determined by the amplitude of the voltage at terminal 46 and by the ratio of the values of resistors 22 and 23. The correct choice of values of resistors 22 and 23 causes the voltage at the base of transistor 24 to be more positive than the voltage at the emitter of transistor 24 during all portions of the AC voltage cycle when all phases provide power to terminal 20. This causes transistor 24 to be nonconductive when all of the three phases of the transformer 10 provide power through diode rectifiers 17, 18 and 19.

When any one of the leads from the three phases of the secondary of transformer 10 does not provide a voltage to one of the diode rectifiers 17, 18 and 19, the transformer 10 operates as a center-tapped single-phase transformer providing the waveform shown in FIG. 3. When any one of the leads from transformer 10 does not provide a voltage to one of the rectifiers, the voltage to input terminal 20 drops below the threshold level to a value of zero during the half-cycle of AC voltage input. During the time that the voltage at input terminal 20 is below the threshold level, the +24 volts at terminal 46 causes a current to flow from terminal 46 through resistor 25, from emitter to base of transistor 24 through resistor 23 to ground, thereby rendering transistor 24 conductive. When transistor 24 is rendered conductive, a current $I_1$ flows from terminal 46 through resistor 25, from emitter to collector of transistor 24 to the upper plate of capacitor 29, thereby charging capacitor 29 to the polarity shown in FIG. 1.

Transistor 24, resistors 22 and 23 and capacitor 29 operate as a threshold detector providing a positive voltage across capacitor 29 when the voltage at terminal 20 decreases below the threshold value. The voltage across capacitor 29 is substantially equal to zero when the voltage at terminal 20 is always greater than the threshold value. Capacitor 29 prevents noise pulses having a short time duration from causing transistor 35 to be rendered conductive even though these pulses may cause transistor 24 to be rendered conductive for a short period of time. If transistor 24 is conductive for a short time only a small charge will be stored on capacitor 29 and the voltage across capacitor 29 will be small so that transistor 35 will be nonconductive. The voltage on capacitor 29 will cause current to flow through resistors 30 and 31 to ground, thereby reducing the charge on capacitor 29. Thus, only signals having a relatively long time duration will cause transistor 24 to be rendered conductive long enough to charge capacitor 29 to a relatively large value of voltage.

When capacitor 29 is charged as shown in FIG. 1, a current $I_2$ flows from the upper plate of capacitor 29 through resistor 30, from base to emitter of transistor 35 to the lower plate of capacitor 29 thereby rendering transistor 35 conductive. When transistor 35 is rendered conductive, current $I_2$ flows from the terminal 46 through a lamp or indicating device 34 from collector to emitter of transistor 35 to ground. Current $I_3$ causes lamp 34 to glow, thereby providing a warning to show that one of the phases in the transformer 10 is no longer providing power through diode rectifiers 17, 18 and 19 and that corrective measures should be taken to restore the output from the phase which is defective. Resistor 31 provides a current path to ground so that any small leakage current through transistor 24 will not cause transistor 35 to be rendered conductive.

A transistor 43 in FIG. 1 operates as an amplifier and inverter to provide an output signal at terminal 47 to indicate the status of the voltage from transformer 10. When transformer 10 provides output voltages to all of the phases causing transistors 24 and 35 to be nonconductive, the voltage at the collector of transistor 35 is substantially the same as the voltage at terminal 46. This causes a small value of current, $I_4$, to flow from the collector of transistor 35 through resistor 38, from base to emitter of transistor 43 thereby rendering transistor 43 conductive. When transistor 43 is rendered conductive a larger value of current, $I_5$, flows from the terminal 46 through resistor 42 to the collector of transistor 43, from collector to emitter of transistor 43 to ground, thereby providing the voltage drop shown across resistor 42. This voltage drop across resistor 42 causes a low value of voltage to appear at the signal output terminal 47. This low value of voltage at terminal 47 indicates that the polyphase transformer 10 is providing voltage to all of the loads 15.

When transistors 24 and 35 are rendered conductive, a much larger current flows through lamp 34 and transistor 35 to ground, thereby causing a relatively large voltage drop of the polarity shown across lamp 34. This relatively large voltage drop across lamp 34 provides a low value of voltage at the collector of transistor 35 and at the base of transistor 43, thereby rendering transistor 43 nonconductive so that the output voltage at output terminal 47 has a relatively high positive value. This voltage can be used to provide a signal to a sequencer or other apparatus which can shut down the power supply or take other corrective measures in the system. Resistor 39 provides a current path to ground so that any small current through resistor 38 will not cause transistor 43 to be rendered conductive.

While the principles of the invention have now been made clear in a preferred embodiment, there will be immediately obvious to those skilled in the art many modifications of structure, arrangement, proportions, the elements, materials, and components used in the practice of the invention, and otherwise, which are particularly adapted for specific environments and operative requirements without departing from those principles. The appended claims are therefore intended to cover and embrace any such modifications within the limits only of the true scope of the invention.

What is claimed is:

1. Apparatus for detecting loss of power in a phase of a polyphase power supply, comprising: a power source having a neutral terminal and a plurality of phase terminals, each of said phase terminals being coupled to one phase of said supply, said neutral terminal being coupled to a reference phase of said supply; a transistor having a base, a collector and an emitter; a plurality of diodes; first and second resistors, each of said diodes being connected between a corresponding one of said phase terminals and a first end of said first resistor, a second end of said first resistor being connected to said base of said transistor, said second resistor being connected between said base of said transistor and said neutral terminal; first and second reference potentials, said emitter of said transistor being coupled to said first potential; a capacitor, said capacitor being connected between said collector of said transistor and said second potential, said second potential being coupled to said neutral terminal; an indicating device; and means for coupling said device to said collector of said transistor.

2. Apparatus for detecting loss of power in a phase of a polyphase power supply, comprising: a power source having a neutral terminal and a plurality of phase terminals, each of said phase terminals being coupled to one phase of said supply, said neutral terminal being coupled to a reference phase of said supply; first and second transistors each having a base, a collector and an emitter; a plurality of diodes; first, second, third, fourth and fifth resistors, each of said diodes being connected between a corresponding one of said phase terminals and a first end of said first resistor, a second end of said first resistor being connected to said base of said first transistor, said second resistor being connected between said base of said first transistor and said neutral terminal; first and second reference potentials, said third resistor being connected between said first potential and said emitter of said first transistor; a capacitor, said capacitor being connected between said collector of said first transistor and said second potential, said second potential being coupled to said neutral terminal, said fourth resistor being connected between said base of said second transistor and said collector of said first transistor; and an indicator, said indicator being connected between said first potential and said collector of said second transistor, said emitter of said second transistor being connected to said second potential, said fifth resistor being connected between said second potential and said base of said second transistor.

3. Apparatus for detecting loss of power as defined in claim 2 including: a third transistor having a base, a collector and an emitter; sixth, seventh and eighth resistors, said sixth resistor being connected between said collector of said second transistor and said base of said third transistor, said emitter of said third transistor being coupled to said second potential, said seventh resistor being connected between said first potential and said collector of said third transistor; and a signal output terminal, said terminal being connected to said collector of said third transistor, said eighth resistor being connected between said second potential and said base of said third transistor.

* * * * *